(12) United States Patent
Morris et al.

(10) Patent No.: US 12,392,856 B2
(45) Date of Patent: Aug. 19, 2025

(54) ANTENNA SYSTEMS AND METHODS FOR TRACKING NON-GEOSYNCHRONOUS SATELLITES

(71) Applicant: VIASAT, INC., Carlsbad, CA (US)

(72) Inventors: Rodney A. Morris, Lawrenceville, GA (US); Patrick E. Tynan, Atlanta, GA (US); David E. Sinyard, Sugar Hill, GA (US)

(73) Assignee: VIASAT, INC., Carlsbad, CA (US)

( * ) Notice: Subject to any disclaimer, the term of this patent is extended or adjusted under 35 U.S.C. 154(b) by 477 days.

(21) Appl. No.: 17/998,450

(22) PCT Filed: May 13, 2021

(86) PCT No.: PCT/US2021/032307
§ 371 (c)(1),
(2) Date: Nov. 10, 2022

(87) PCT Pub. No.: WO2021/231769
PCT Pub. Date: Nov. 18, 2021

(65) Prior Publication Data
US 2023/0179296 A1 Jun. 8, 2023

Related U.S. Application Data

(60) Provisional application No. 63/024,504, filed on May 13, 2020.

(51) Int. Cl.
*G01S 3/38* (2006.01)
*G01S 3/22* (2006.01)
(Continued)

(52) U.S. Cl.
CPC ............... *G01S 3/38* (2013.01); *G01S 3/22* (2013.01); *G01S 3/32* (2013.01); *G01S 3/56* (2013.01)

(58) Field of Classification Search
CPC ..... G01S 3/14; G01S 3/16; G01S 3/20; G01S 3/22; G01S 3/28; G01S 3/30; G01S 3/32;
(Continued)

(56) References Cited

U.S. PATENT DOCUMENTS 6,002,364 A 12/1999 Kroeger et al.
6,061,339 A 5/2000 Nieczyporowicz et al.
(Continued)

FOREIGN PATENT DOCUMENTS

CN 112290991 A * 1/2021 ......... H04B 7/18519
WO WO-03094287 A1 * 11/2003 ............... G01S 3/20

OTHER PUBLICATIONS

International Search Report dated Sep. 28, 2021 in corresponding PCT Application No. PCT/US2021/032307 (13 pages).
(Continued)

*Primary Examiner* — Vladimir Magloire
*Assistant Examiner* — Fred H Mull
(74) *Attorney, Agent, or Firm* — F. CHAU & ASSOCIATES, LLC (57) ABSTRACT

A method performed by a ground station antenna system for tracking a non-Geo satellite. A signal is received from the satellite and a signal quality metric associated with the signal is estimated. A first tracking mode is selected and implemented when the estimated signal quality metric is below a threshold, in which the signal is demodulated to obtain demodulated signal quality metric (DSQM) estimates, and then a first tracking operation is performed to point an antenna beam at the satellite based on the DSQM estimates. A second tracking mode is selected and implemented when the estimated signal quality metric is above the threshold, in which signal strength estimates of the signal are obtained and then a second tracking operation is performed
(Continued)

to point the antenna beam at the satellite based at least in part on the signal strength estimates.

24 Claims, 7 Drawing Sheets

(51) Int. Cl.
*G01S 3/32* (2006.01)
*G01S 3/56* (2006.01)

(58) Field of Classification Search
CPC ........ G01S 3/325; G01S 3/38–44; G01S 3/56; G01S 3/58
See application file for complete search history.

(56) References Cited

U.S. PATENT DOCUMENTS

| | | | |
|---|---|---|---|
| 6,370,183 B1 | 4/2002 | Newson et al. | |
| 6,417,803 B1 | 7/2002 | de La Chapelle et al. | |
| 6,680,913 B1* | 1/2004 | Malmivirta | H04B 17/0085 |
| | | | 455/67.14 |
| 6,708,019 B2 | 3/2004 | McLain et al. | |
| 7,068,615 B2 | 6/2006 | Niesen | |
| 7,136,621 B2 | 11/2006 | de La Chapelle et al. | |
| 7,403,557 B2 | 7/2008 | Pan et al. | |
| 7,751,337 B2 | 7/2010 | McLain | |
| 10,884,094 B2 | 1/2021 | Johnson et al. | |
| 2007/0279276 A1* | 12/2007 | Conn | G01S 3/325 |
| | | | 342/149 |
| 2012/0068880 A1* | 3/2012 | Kullstam | G01S 3/38 |
| | | | 342/81 |
| 2017/0254903 A1* | 9/2017 | Johnson | G01S 3/38 |
| 2019/0013566 A1 | 1/2019 | Merrell | |
| 2020/0200853 A1* | 6/2020 | Horimoto | G01S 3/325 |

OTHER PUBLICATIONS

Pirsiavash, et al., "GNSS Signal and Measurement Quality Monitoring for Multipath Detection and Mitigation", University of Calgary, PRISM: University of Calgary's Digital Repository, Schulich School of Engineering, Aug. 2019, pp. 1-29.

* cited by examiner

ANTENNA SYSTEMS AND METHODS FOR TRACKING NON-GEOSYNCHRONOUS SATELLITES

CROSS REFERENCE TO RELATED APPLICATIONS

The present Application is a 371 National Stage entry of PCT application no. PCT/US2021/032,307, filed May 13, 2021, entitled ANTENNA SYSTEMS AND METHODS FOR TRACKING NON-GEOSYNCHRONOUS SATELLITES, which claims the benefit of priority to U.S. Provisional Application No. 63/024,504 filed on May 13, 2020, entitled SYSTEMS AND METHODS FOR TRACKING LEO SATELLITES, the entireties of which are incorporated herein by reference.

TECHNICAL FIELD

This disclosure relates generally to satellite communications and more particularly to ground based antenna systems and methods for tracking non-geosynchronous earth orbit (non-Geo) satellites.

DISCUSSION OF RELATED ART

Non-Geo satellites include low earth orbit (Leo) satellites, which orbit up to about 2,000 km above earth, and medium earth orbit (Meo) satellites, which orbit between about 2,000 km and 35,000 km above earth. Throughout the day, a non-Geo satellite moves across fixed ground locations around the globe, often quite rapidly. For instance, a ground station antenna (e.g., a gateway antenna) may communicate with any given satellite for only up to 15 minutes, i.e., the time the satellite moves from horizon to horizon across the antenna's field of view. Thus, a constellation of non-Geo satellites may act in concert to enable continuous communications with a ground station via handover from one satellite to the next.

As a non-Geo satellite traverses the sky and communicates with a ground station, the ground station may track the position of the satellite and adjust the direction of its beam peak to point at the satellite and thereby optimize communication signal quality. Example tracking methods for the tracking include "program tracking", which does not require signal strength measurement data for beam adjustments, and "autotracking", which does rely on signal strength measurement data. With program tracking, a path of the satellite is predicted based on satellite information provided to/calculated by the ground station, and the beam peak is adjusted to follow the predicted path. Autotracking techniques, such as monopulse tracking and mispointing correction methods, allow the system to accurately point at the satellite by compensating for errors in the satellite's path and/or in the system alignment. Monopulse tracking typically involves receiving the satellite signal with fixed auxiliary antennas and determining the signal direction by adding and subtracting the received signals from the auxiliary antennas. Mispointing correction methods involve periodically mispointing the peak direction of a main antenna's beam and measuring receive signal strength or quality for each mispointed condition to arrive at an optimized peak direction. Some examples of mispointing correction methods include "hill climbing", in which subsequent test directions in the process depend on a current test direction result, and conical scanning, in which a mispointing test sequence follows a predetermined conical path with respect to a starting direction.

SUMMARY

An aspect of the present disclosure relates to a method performed by a ground station antenna system for tracking a non-Geo satellite. In the method, a signal is received from the satellite and a signal quality metric (SQM) associated with the signal is estimated. A first tracking mode is selected and implemented when the estimated SQM is below a threshold. In the first tracking mode, the signal is demodulated and demodulated signal quality metric (DSQM) estimates are obtained; then a first tracking operation is performed to point an antenna beam at the satellite based on the DSQM estimates. A second tracking mode is selected and implemented when the estimated SQM is above the threshold. In the second tracking mode, signal strength estimates of the signal are obtained via a measurement device. A second tracking operation is then performed to point the antenna beam at the satellite based at least in part on the signal strength estimates.

The DSQM based tracking is more accurate and reliable for low quality signals as compared to signal strength based tracking. On the other hand, when received signal strength and quality is high, signal strength based tracking may be superior. Accordingly, methods of the present disclosure may optimize tracking performance throughout the non-Geo satellite's path with respect to the ground station antenna, and may increase the range for which signal communication with requisite quality is feasible.

An example of the signal quality metric (SQM) is signal to noise ratio (SNR), which may be estimated through direct measurement by the antenna system. Alternatively, the SNR is estimated as a value corresponding to a predicted elevation position of the satellite in accordance with ephemeris data obtained by the antenna system.

Examples of the DSQM include Energy per bit/Noise-spectral density (EbNo); Energy per symbol/Noise-spectral density (EsNo); Error Vector Magnitude (EVM); and Bit Error Rate (BER).

In another aspect, a ground station antenna system includes an antenna for at least receiving signals from a non-Geo satellite; a receiver including a demodulator to demodulate the signals received by the antenna, and signal strength estimation circuitry to measure received signal strength of the signals; a pointing mechanism configured to control a beam pointing direction of the antenna; and an antenna controller that tracks the non-Geo satellite and causes the pointing mechanism to control the beam pointing direction of the antenna in accordance with the tracking. The tracking mechanism may include operations delineated in the method summarized above.

In another aspect, a non-transitory computer-readable recording medium stores instructions that, when executed by a processor, cause a ground station antenna system to implement a method as outlined above for tracking a non-geosynchronous earth orbit (non-Geo) satellite.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label with an underscore/dash and second label that distinguishes among the same/similar elements (e.g., _1, _2), or directly annexing the reference label with a second label. However, if a given description uses only the first reference label, it is applicable to any one of the same/similar elements having the same first reference label irrespective of the second label. Elements and features may not be drawn to scale in the drawings.

DETAILED DESCRIPTION OF EMBODIMENTS

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person of ordinary skill in the art.

In one approach to tracking, a ground station may program track a satellite until the signal strength of the received satellite signal is strong enough for autotracking. However, many modern waveforms use very low forward error coding (FEC) rates, which makes it difficult for the ground station to initiate autotracking of the target satellite using this conventional technique.

Figure 1:
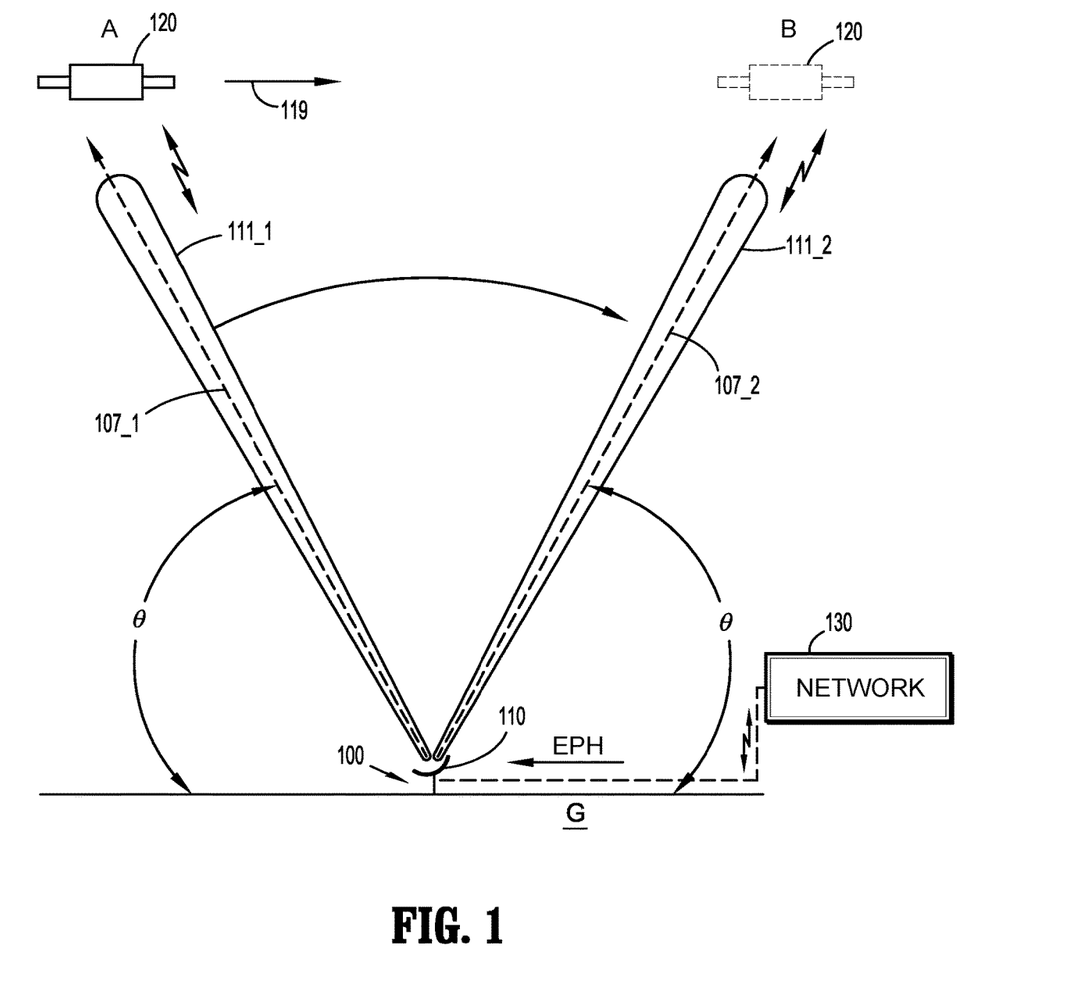
FIG. 1 conceptually illustrates a tracking system for tracking a non-Geo satellite according to an embodiment.

FIG. 1 conceptually illustrates a tracking system for tracking a non-Geo satellite according to an embodiment. A ground station antenna (GSA) system 100 communicates with and tracks a non-Geo satellite 120 as it travels in a path 119 from a signal acquisition location A to a termination location B with respect to a communication range of GSA system 100. Satellite 120 may be part of a non-Geo satellite constellation of tens or over one hundred satellites that sequentially communicate with GSA system 100 throughout the day. Satellite 120 may traverse the path 119 between locations A and B in as little as fifteen minutes in a typical scenario. In other examples, satellite 120 is not part of a satellite constellation, and satellite 120, after completing the communication session with GSA system 100 at location B, may return to path 119 hours or days later.

GSA system 100 includes an antenna 110 that may form a pencil beam 111 symmetric about a boresight axis 107 (coinciding with the peak of the beam) for communication of signals with satellite 120. For traffic signal communications, it is desirable to maintain the beam peak pointing at satellite 120 throughout the satellite's movement within the range of GSA system 100. For example, when satellite 120 is at position A, antenna 110 is controlled to form beam 111_1 pointing in direction 107_1 towards satellite 120, and when satellite 120 is a position B, antenna 110 is controlled to form beam 111_2 pointing in direction 107_2. Antenna 110 may be a mechanically steerable parabolic dish or array antenna, or an electronically steered array antenna. GSA system 100 may be a gateway communicatively connected to a network 130 in a wired and/or wireless manner. GSA system 100 may route traffic signals between satellite 120 and network 130. Network 130 may also provide ephemeris data EPH of satellite 120 to GSA system 100 to facilitate signal acquisition and tracking with respect to satellite 120. Alternatively, GSA system receives ephemeris data EPH directly from satellite 120 or from another satellite (not shown) it had previously communicated with.

When antenna beam 111 points directly at satellite 120, an elevation angle ⊖ with respect to satellite 120 and antenna 110 may be defined as an acute angle formed between the boresight axis 107 and ground G. A field of view of antenna 110 may be defined as an angular range in which a steerable beam 111 sufficient for signal communication with satellite 120 can be formed. In a typical scenario, as the satellite 120 approaches antenna 110's field of view, GSA system 100 may form beam 111_1 pointing in direction 107_1 at satellite 120 in accordance with ephemeris data EPH. Tracking the satellite 120's path and steering the antenna beam 111 to continually point at satellite 120 just in accordance with data EPH may be referred to as program tracking. However, since ephemeris data EPH only provides a coarse approximation of satellite 120's position, a fine tracking operation using the ephemeris data EPH as a reference, may be performed to more precisely track satellite 120's position. Such fine tracking may also be referred to as autotracking. Example methods for the fine tracking include a mispointing correction method and a monopulse tracking method, as noted earlier and discussed further below.

As satellite 120 comes into antenna 110's field of view, it has a relatively low elevation angle ⊖ and is relatively far away. Hence, the satellite signal received by GSA system 100 may be relatively weak, and ground reflections causing noise and interference may be more likely. Thus, a signal quality metric (SQM) such as signal to noise ratio (SNR) or signal to interference plus noise (SINR) may be below a threshold for which a pure signal strength tracking method's performance is acceptable or can be performed. As explained further below, in this case, it is beneficial to implement the fine tracking using a first tracking mode based on a demodulated signal quality metric (DSQM) estimates, which are based on measurements of the received satellite signal after demodulation and an error correction decoding process. Examples of DSQM include Energy per bit/Noise-spectral density (EbNo); Energy per symbol/Noise-spectral density (EsNo); Error Vector Magnitude (EVM); Bit Error Rate (BER), or any combination of these. The DSQM based tracking mode may arrive at an optimum beam pointing direction as the direction of a beam peak producing the highest DSQM reading (e.g., highest values for EbNo or EsNo, or the lowest values for EVM or BER) within a test sector range. The test sector range may be referenced to the satellite 120 direction as determined from the program tracking. When the satellite signals are received with low signal quality, fine tracking may otherwise be infeasible or inferior using purely a signal strength based method without a DSQM estimate.

In accordance with embodiments described more fully below, as satellite 120 continues on its predetermined path 119, its distance to antenna 110 decreases (in correspondence with an increase in the elevation angle Θ), the received satellite signal becomes stronger, and the signal quality metric may eventually cross above the threshold (at a point between positions A and B). GSA system 100 may then switch the tracking mode to a second tracking mode that is based at least in part on signal strength measurements. The second tracking mode may use the same or different tracking technique as the first tracking mode. When the signal strength is high, DSQM tracking may be less accurate than signal strength based tracking, since DSQM measurements may become saturated but signal strength measurements do not saturate. For instance, as the received signal strength increases above a certain level, errors in the demodulated signal may become small enough such that further increases in signal strength do not translate as much into further bit errors or the like. The DSQM measurement may effectively become saturated because the measurement result may no longer accurately detect the peak of the beam during a mispointing procedure that is continually or periodically performed as the satellite movement progresses. In other words, during the mispointing procedure, the antenna beam peak may be continually mispointed (e.g., dithered) from an optimum beam peak direction of peak receive signal strength, to a non-optimum direction in which less signal power is received. However, when the signal strength is above a certain level, the DSQM result measured at the optimum beam peak direction may be barely changed or indistinguishable from the DSQM result at the non-optimum direction. In such a case, the DSQM measurement is said to be saturated. On the other hand, a signal strength measurement does not saturate during either a mispointing procedure or during monopulse tracking.

As the satellite's movement progresses still further, its distance from the antenna increases, the signal quality worsens to fall below the threshold, and the tracking mode switches back to the DSQM-based tracking mode. Accordingly, by switching between tracking methods based on the signal quality threshold, an optimum tracking method is selectable throughout the duration of the satellite 120's traversal path 119 with respect to antenna 110. Thus, communication may be performed over a wider dynamic range of signal quality, thereby increasing the range of communication between satellite 120 and antenna 110. Thereby, for a given orbital path 119, satellite 120 may successfully communicate with GSA system 100 for a longer time interval.

Figure 2A:
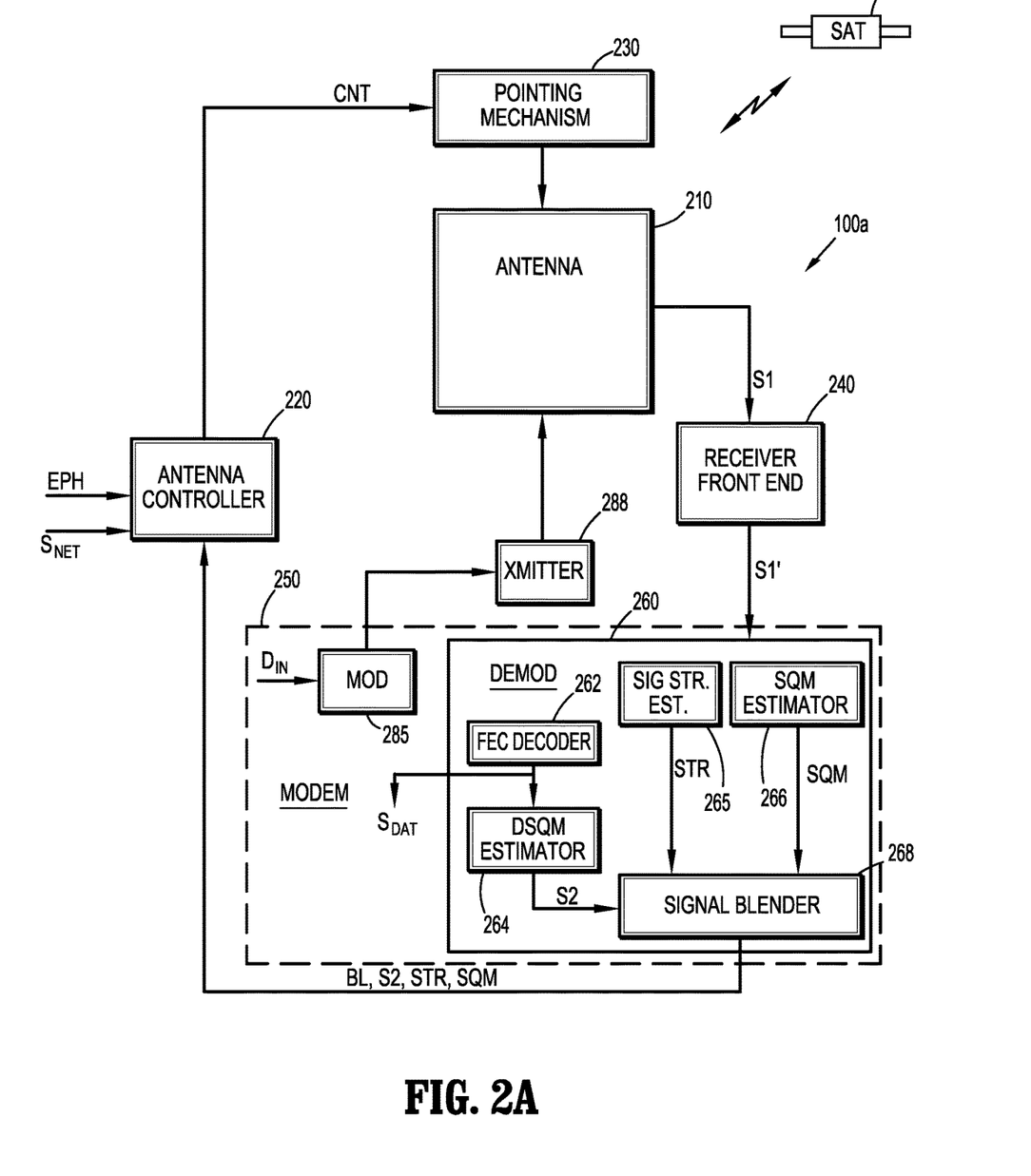
FIG. 2A is a functional block diagram of an example ground station antenna system according to an embodiment.

FIG. 2A is a functional block diagram of an example ground station antenna (GSA) system according to an embodiment. GSA system 100a is an embodiment of GSA system 100 discussed above and may include an antenna 210, an antenna controller 220 (interchangeably, "antenna control unit"), a pointing mechanism 230, and a receiver comprising a receiver front end 240 and a demodulator 260. For bidirectional communication applications with satellite 120, demodulator 260 may be part of a modem 250 that also includes a modulator 285. Demodulator 260 may include a forward error correction (FEC) decoder 262, a DSQM estimator 264, a signal strength estimator 265, a signal quality metric (SQM) estimator 266, and a signal blender 268, any of which may be configured with dedicated or shared logic/processing circuitry (e.g., a processor executing instructions read from a non-transitory memory) and/or analog circuitry.

Antenna controller 220 outputs control signals CNT to pointing mechanism 230, which responds by steering a beam formed by antenna 210 to point in a targeted direction. In some embodiments, antenna 210 is a reflector antenna or other non-electronically steerable antenna such as a fixed planar array, and pointing mechanism 230 may be a mechanical step-motor positioner. In other embodiments, antenna 210 is an electronically steerable antenna such as a phased array, and pointing mechanism 230 may include a distribution network with phase shifters, switches, etc. for electronically steering a beam formed by antenna 210. In this case, a combination of mechanical and electronic steering is a further option to expand the overall antenna field of view.

In the receive path, antenna 210 receives a signal S1 from satellite 120 and provides the same to receiver front end 240. Receiver front end 240 may adjust receive signal S1 by filtering, amplifying and downconverting the same using a bandpass filter, low noise amplifier (LNA) and downconverter (not shown). The adjusted signal (S1') is then output to demodulator 260 where it is demodulated and decoded by FEC decoder 262 to generate a data signal $S_{DAT}$. Data signal $S_{DAT}$ may be a baseband traffic or control signal which is output to a further network component (not shown) in the communication system for further processing/routing. Concurrently, data signal $S_{DAT}$ may be applied to DSQM estimator 264, which may estimate the DSQM of $S_{DAT}$ and output a signal S2 representing the DSQM estimate, which is an estimate of signal quality after a forward error correction (FEC) decoding process has already occurred on the demodulated signal.

Meanwhile, SQM estimator 266 may estimate a signal quality metric of signal S1', such as signal to noise (SNR), signal to interference plus noise (SINR), or (signal plus noise)/noise ((S+N)/N) and generate an estimated signal SQM representing the same. The signal quality metric estimated by SQM estimator 266 is an estimate of signal quality before demodulation. Signal strength estimator 265 may estimate the signal strength of signal S1' and output a signal STR reflecting signal strength of receive signal S1. (Gain of an LNA may be fixed throughout the satellite 120 path for which measurements are taken, thus, signal strength measurements may always be taken after amplification and downconversion. The measurement may be normalized based on the noise floor just prior to acquisition of the satellite signal S1.) Signals STR, SQM and S2 may each be applied to signal blender 268. In another example, signal SQM serves as both an estimate of signal quality and signal strength, such that signal strength estimator 265 can be omitted. In other words, the signal strength estimate itself may be obtained as a measurement of SNR, SINR or (S+N)/N. In this case, SQM estimator 266 may effectively function as both a signal strength estimator and an SQM estimator (since SQM is both a signal quality metric estimate and a signal strength estimate).

In some embodiments, signal blender 268 functions as a multiplexer to just output individual signals S2, STR and SQM to antenna controller 220. In other embodiments, signal blender 268 outputs either signal S2 or signal STR to antenna controller 220 based on the value of signal SQM. For instance, if signal SQM is below a threshold, signal S2 is output, otherwise, signal STR is output. In still other embodiments, signal blender 268 outputs a blended signal BL which may represent: signal S2 when SQM is below a first threshold; an average (e.g., weighted average) of signals S2 and STR when SQM is above the first threshold but below a second threshold; and signal STR when SWM is above the second threshold. (Any of the other signals among STR, SQM and S2 may be multiplexed with signal BL and output from signal blender 268 along with signal BL.)

In an alternative configuration, signal blender 268 is part of antenna controller 220 rather than demodulator 260. In this case, modem 250 may be embodied as a commercially available modem that provides a DSQM output as well as an SNR output. In the configuration shown in FIG. 2A, modem 250 may be the same type of commercially available modem, but with the addition of signal blender 268.

On transmit, modulator 285 may modulate an input data signal DIN and output the modulated signal to a transmitter 288 for amplification and transmission to satellite 120 via antenna 210. In a unidirectional embodiment such as broadcast reception, modulator 285 and transmitter 288 may be omitted.

Figure 2B:
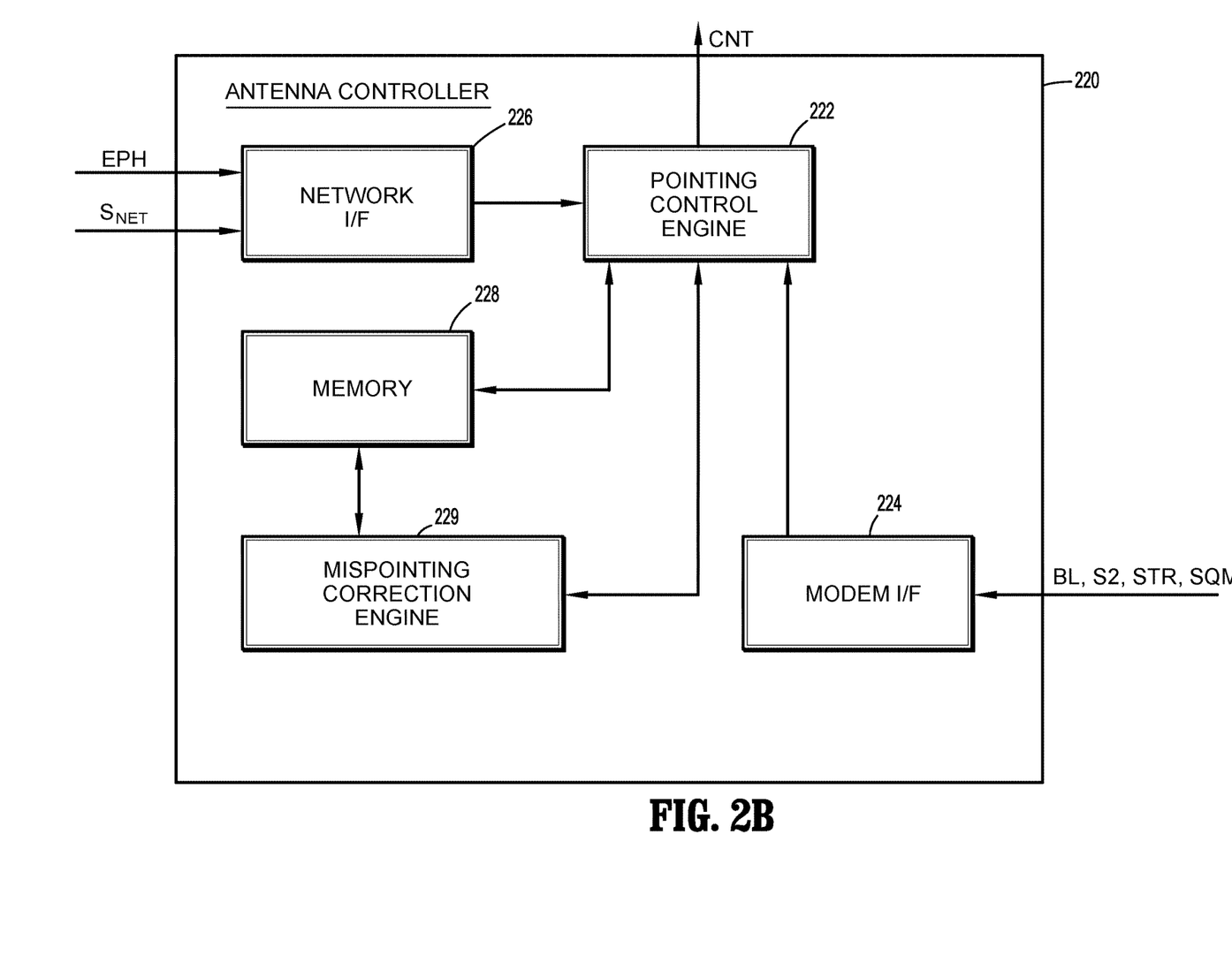
FIG. 2B is a functional block diagram of an antenna controller of the example ground station antenna system.

Antenna controller 220 may receive signal(s) BL, S2, STR and/or SQM output from demodulator, as well as ephemeris data signal EPH from network 130, and generate control signals CNT to pointing mechanism 230 based thereon. FIG. 2B is an example block diagram of antenna controller 220. Antenna controller 220 may include a pointing control engine 222, a modem interface 224, a network interface 226, memory 228 and a mispointing correction engine 229.

Modem interface 224 may receive the satellite tracking output signal(s) from demodulator 260, i.e., one or more of signals BL, S2, STR and SQM, and provide the same to pointing control engine 222. Network interface 226 may receive ephemeris data EPH as well as general control/information signals $S_{NET}$ from network 130, and route data EPH and signals $S_{NET}$ to pointing control engine 222. Mispointing correction engine 229 and pointing control engine 222 may each be embodied as processing circuitry executing instructions read from memory 228. Pointing control engine 222 may store data EPH in memory 228 for current and future use. Pointing control engine 222 may run a pointing control program designed to produce control signals CNT to, initially, cause pointing control mechanism 230 to control antenna beam 111 to coarsely point at satellite 120 based on data EPH. Such coarse pointing may be referred to as beam steering according to "program track". The pointing control program may further cooperate with mispointing correction engine 229 to control periodic mispointing of the antenna beam 111 to implement fine tracking. For instance, when SQM is below the above-mentioned predetermined threshold, pointing control engine 222 may compute a fine tracking direction based on signal S2 providing DSQM data. When SQM is above the threshold, pointing control engine 222 may compute the fine tracking direction based on signal strength signal STR.

In one embodiment, mispointing correction engine 229 runs a conical tracking ("contrack" or "conscan") algorithm in which, starting at the coarse (program track) pointing direction according to data EPH, computes a conical path for mispointing antenna beam 111 from the coarse pointing direction on a stepped basis. Pointing control engine 222 outputs control signals CNT according to the computed mispointed directions, and for each mispointed direction, a selected signal S2, BL or STR may be monitored. The monitored signal selection may be based on whether signal SQM is above or below the threshold, e.g., using the SQM estimation when antenna beam 111 points in the coarse pointing direction. Since the satellite 120 is still moving throughout the receive signal testing for the mispointed beams, such movement may be taken into account using a path modeling. When the signal testing over the conical path is completed, pointing control engine 222 may determine which mispointed direction resulted in the highest value for S2, STR or BL (as the case may be), corresponding to an optimally aligned direction. The optimally aligned direction may be a direction offset from the coarse (program track) direction.

In another embodiment, a mispointing path is dynamically computed based on hill climbing, where each mispointing iteration is made in the direction of increasing signal strength, increasing DSQM, or a combination thereof based on signals S2, STR or BL. The hill climbing algorithm may also take into account the satellite's movement between successive steps.

Once the optimally aligned direction is determined, pointing control engine 222 may then compute a corrected steering path (an "autotrack" path) for antenna 210 based on the optimally aligned direction. The corrected steering path may be a path offset from the coarse program track based steering path otherwise computed on the basis of just the ephemeris data EPH. Pointing control engine 222 and mispointing control engine may thereafter periodically repeat the mispointing procedure starting from either the program track direction or the autotrack path direction. The autotrack path may then be updated.

Figure 3A:
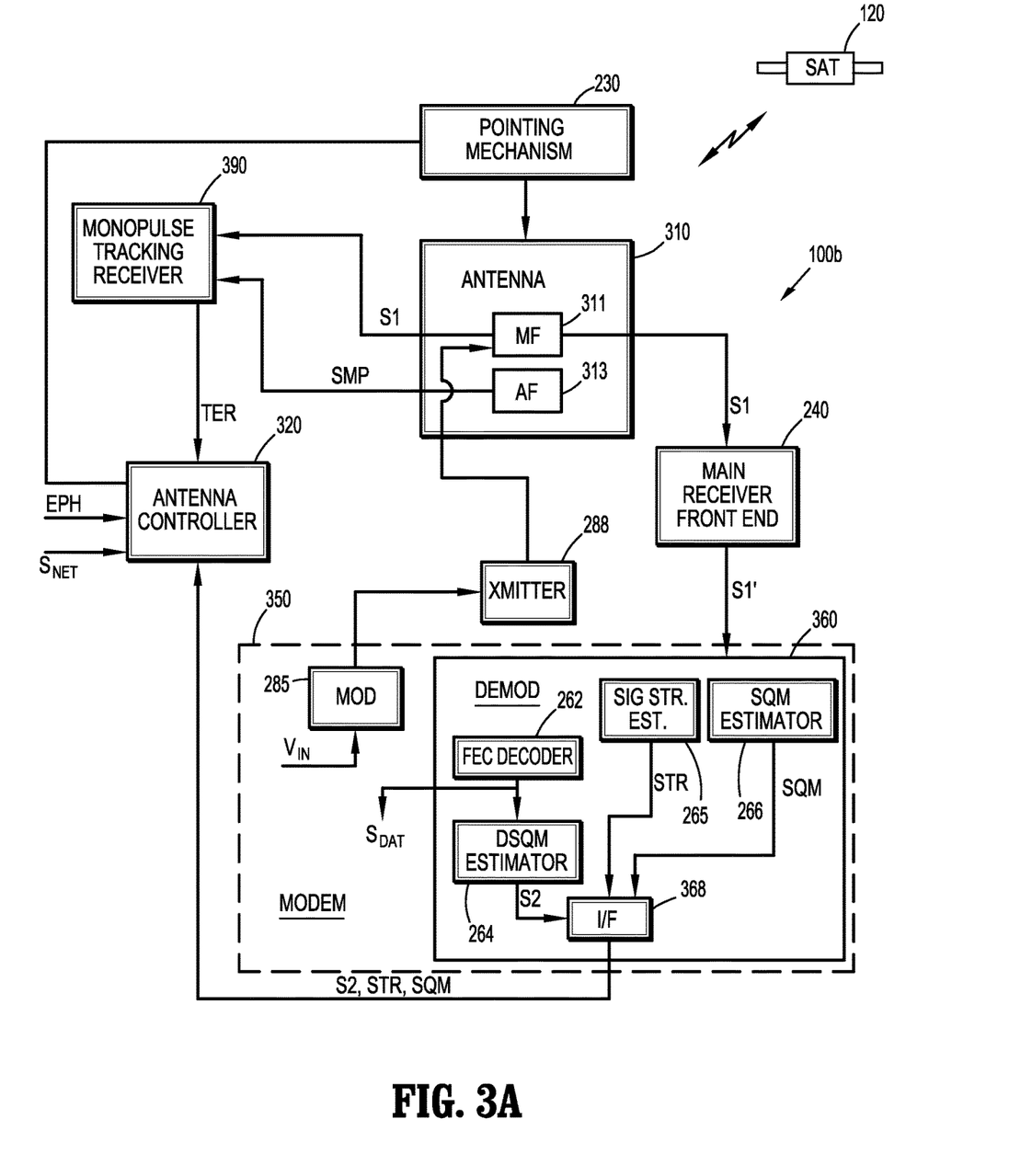
FIG. 3A is a functional block diagram of an example ground station antenna system according to another embodiment.

FIG. 3A is a functional block diagram of an example ground station antenna (GSA) system, 100b, according to another embodiment. GSA system 100b differs from GSA system 100a by utilizing a monopulse tracking technique for autotracking of satellite 120 during at least the time that the estimated SQM is above the threshold. To this end, GSA system 100b may include an antenna 310, an antenna controller 320, a demodulator 360 (e.g., part of a modem 350) and a monopulse tracking receiver 390. Pointing mechanism 230, receiver front end 240, modulator 285 and transmitter 288 may be the same as that described for GSA system 100a.

Antenna 310 may include a main feed 311, such as a center feed of a parabolic dish, that receives and routes signal 51 to main receiver front end 240, and routes a coupled portion of signal 51 to monopulse tracking receiver 390. Auxiliary feeds 313 may surround main feed 311 and concurrently provide monopulse signals SMP based on the same signal transmitted from satellite 120. In an example, auxiliary feeds 313 are four horn antennas symmetrically surrounding, and aligned with, main feed 311. In another example, antenna 310 is an antenna array (a planar, 3D or linear array) and auxiliary feeds 313 may be antennas separate from the aperture of the array. Alternatively, auxiliary feeds 313 are shared antenna elements of the array, and suitable directional couplers are connected to couple signal energy for the signals SMP independently of signal 51 applied to the main receiver. Tracking receiver 390 may generate a monopulse tracking error signal TER based on signals S1 and SMP in a known manner. When antenna 310 forms beam 111 with its peak optimally aligned with the peak direction of the satellite (corresponding to an alignment with the wave front of the satellite 120 beam), tracking error signal TER may be a minimum value. In other words, when signal TER is at a minimum, signal S1 may be at a maximum level for a given signal transmission by satellite 120. Thus, tracking error signal TER may be understood as a signal providing a signal strength estimate.

Demodulator 360 may differ from demodulator 260 of antenna 100a by substituting a demodulator interface 368 for signal blender 268. This is because, when SQM exceeds the threshold, signal strength estimates made through monopulse tracking receiver 390 may be applied to antenna controller 320 as just described. Thus, when SQM is above the threshold, interface 368 may just multiplex signals S2, STR and SQM for output to antenna controller 320. Other aspects of demodulator 350/modem 350 may be the same as described above for demodulator 260/modem 250.

Figure 3B:
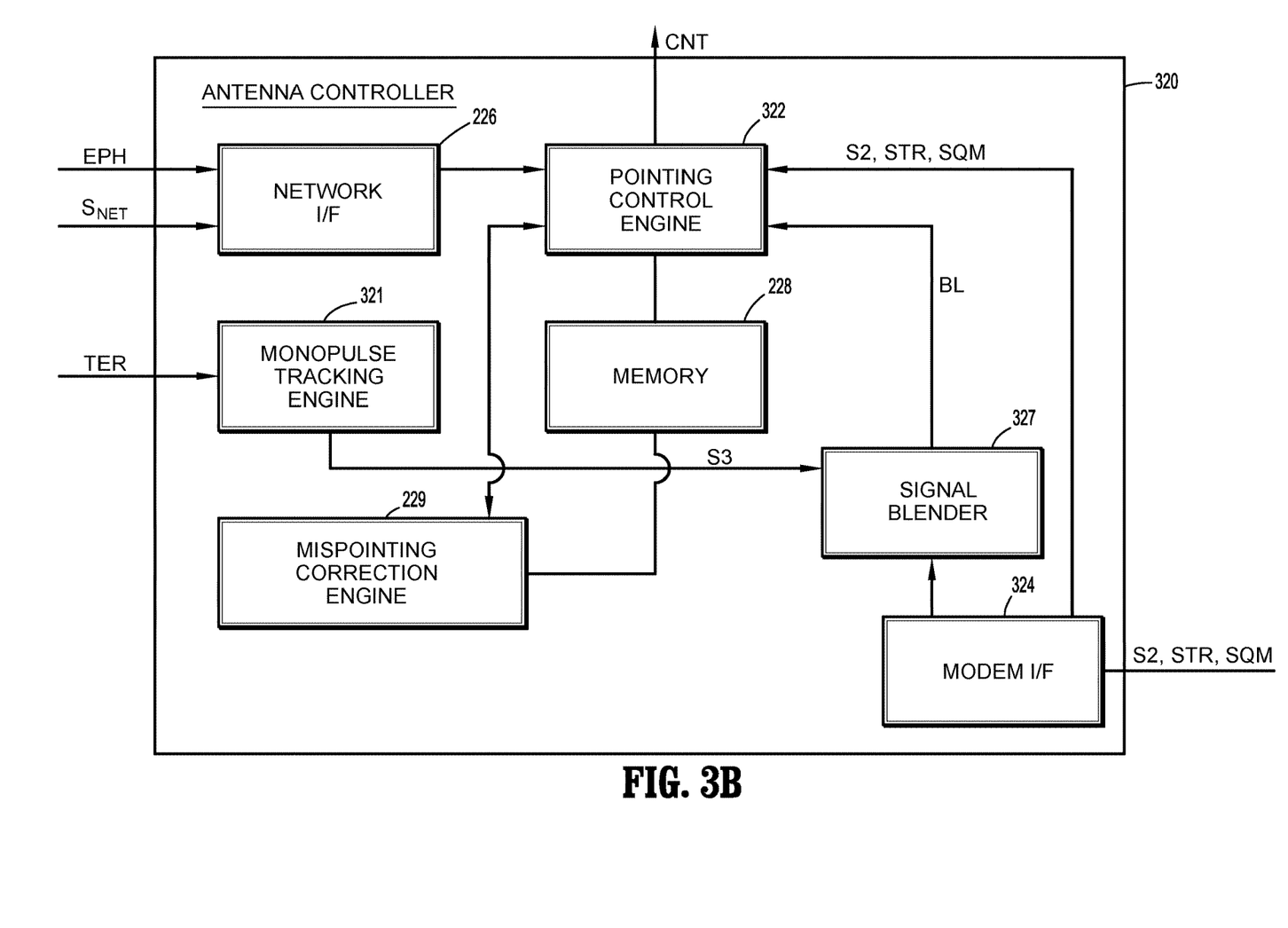
FIG. 3B is a functional block diagram of an antenna controller of the example ground station antenna system of FIG. 3A.

FIG. 3B is a functional block diagram of antenna controller 320 of GSA system 100b. Antenna controller 320 may differ from antenna controller 220 by including a monopulse tracking engine 321, a signal blender 327, and a pointing control engine 322 operating differently from pointing control engine 222. Modem I/F 324 may receive signals S2, STR and/or SQM at any given time; these signals may be directly routed to pointing control engine 322. Monopulse tracking engine 321 may continually receive tracking error signal TER from monopulse tracking receiver 390, where signal TER is indicative of receive signal strength as noted above (albeit, TER may be inversely related to signal strength). Monopulse tracking engine 321 may provide a signal S3 indicative of signal strength based on signal TER to signal blender 327. When signal SQM is below the threshold, pointing control engine 322 may cooperate with mispointing correction engine 229, and cause antenna controller 320 to operate the same way as antenna controller 220. Thus, the same signals CNT may be output in accordance with program track and autotrack operations based on a mispointing correction algorithm and DSQM (S2) estimates. When signal SQM exceeds the threshold, in one embodiment, signal blender 327 may output signal BL to pointing control engine 322, where signal BL is indicative of signal strength based on signal S3. In an alternative embodiment, when signal SQM exceeds the threshold but is below a second predetermined threshold, signal blender 327 generates signal BL representing a weighted average of signal strength based signals S3 and STR. These techniques are explained further below.

Figure 4:
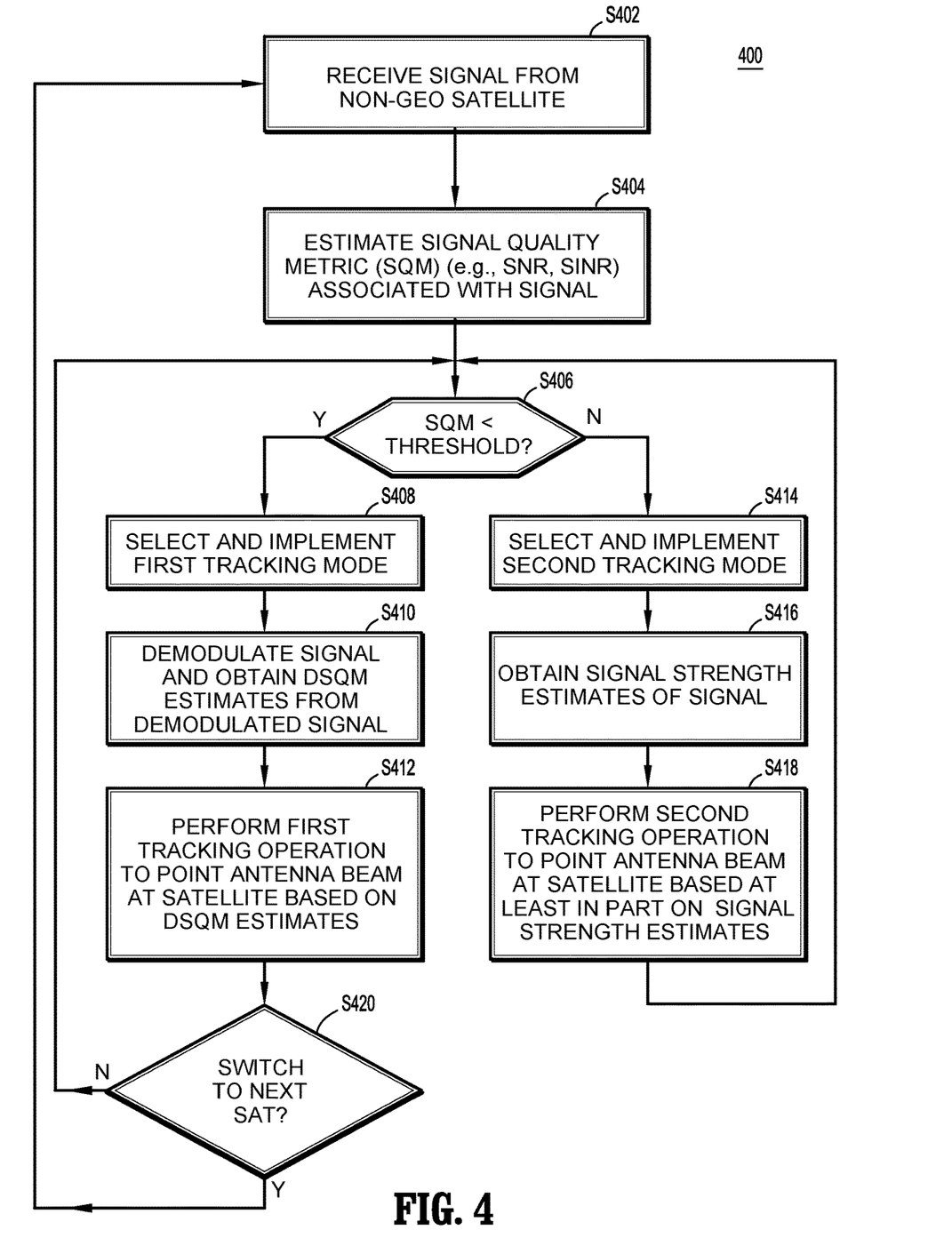
FIG. 4 is a flow chart illustrating a method for tracking a non-Geo satellite according to an embodiment.

FIG. 4 is a flow chart illustrating a method, 400, for tracking a non-Geo satellite according to an embodiment. Method 400 may be performed by ground station antenna (GSA) system 100 (e.g., 100a or 100b) described above. In the method, when non-Geo satellite 120 comes into the GSA system 100 antenna's field of view, GSA system 100 receives a signal from satellite 120 (S402). The receive signal (S1) may be adjusted through the receiver (receiver front end 240 and demodulator 260/360) by band pass filtering, amplifying and down-converting the signal. The receiver may then estimate a signal quality metric (SQM) such as SNR or SINR associated with the signal (S404). This may involve sampling signal S1 at a designated circuit point in the receiver chain; sampling noise and/or running an algorithm to compute the N/I (noise or noise+interference) riding on signal S1 at the designated circuit point; and comparing the signal and N/I samples. The estimated SQM may then be compared to a threshold (S406), which may be predetermined based on capabilities and requirements of the particular system.

When SQM is below the threshold, antenna controller 220/320 may select and implement a first tracking mode based on DSQM estimates (S408). In the first tracking mode, demodulator 260/360 may demodulate the signal to provide both an output demodulated signal $S_{DAT}$ (a traffic or control signal) and an DSQM estimate (signal S2) with respect to the satellite signal S1 (S410). A first tracking operation to point the antenna beam 111 at satellite 120 may then be performed based on the DSQM estimates (S412). For example, some demodulators available today, through use of an FEC decoder 262, have the capability of both extracting a satellite signal from noise and accurately measuring DSQM even when the SNR is below zero, i.e., noise power is higher than signal power. (Accuracy may be determined, e.g., by bit to error ratio (BER) of the recovered signal.) The DSQM based (first) tracking operation may involve the mispointing correction operations described above for antenna controllers 100a/100b, which may determine the antenna pointing direction that results in the highest DSQM estimate.

Unless the antenna controller determines it is time to switch communication and tracking operations to a next satellite 120 (S420), operations 408-412 may be continually performed until SQM is above the threshold (a NO result at S306). When SQM exceeds the threshold, the method selects and implements a second tracking mode (S414) in which signal strength estimates of the satellite signal are obtained by the receiver (S416) and a second tracking operation to point the antenna beam 111 at satellite 120 is performed based at least in part on the signal strength estimates (S418). In one embodiment, whenever the signal strength is estimated above the threshold, the second tracking operation does not use DSQM estimates but is instead based entirely on signal strength estimates, e.g., signal STR obtained by demodulator 260 or signal S3 determined by antenna controller 360 based on monopulse tracking.

Figure 5:
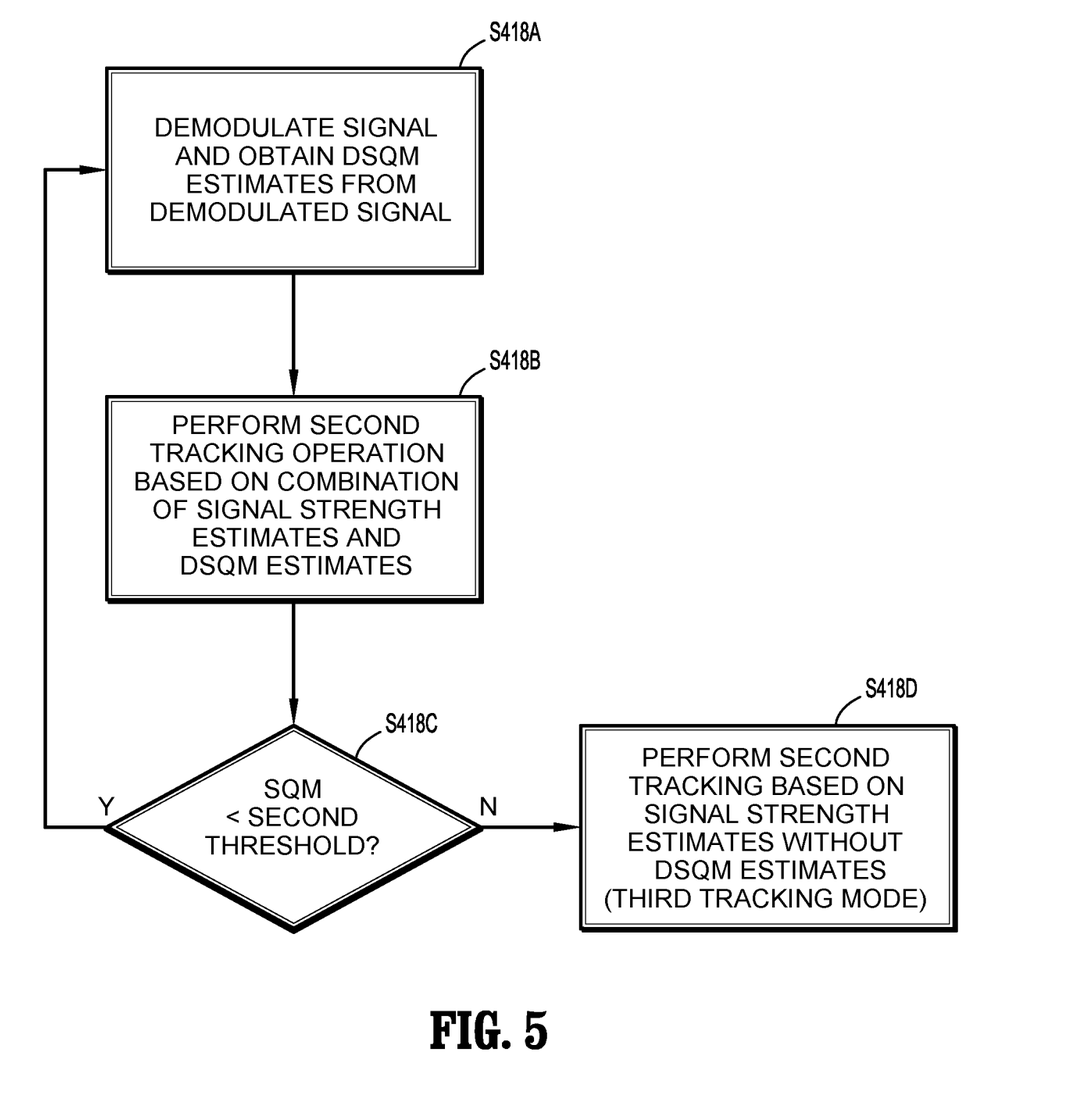
FIG. 5 depicts example sub-operations of a second tracking operation in the method of FIG. 4.

FIG. 5 depicts example sub-operations of the second tracking operation S418 in method 400 of FIG. 4, according to an embodiment. In this embodiment, the threshold of operation S406 is a first threshold, and the signal continues to be demodulated and DSQM estimates are obtained from the demodulated signal after SQM passes the first threshold (S418A). At this time, the second tracking operation is performed using signal blender 268 or signal blender 368 based on a combination of signal strength estimates and the DSQM estimates (S418B). For instance, in the case of GSA system 100a, signals S2 (representing DSQM) and STR may be purely averaged or averaged on a weighted basis, to produce a blended signal BL representing the average. A mispointing correction routine run by mispointing correction engine 229/pointing control engine 222 may then be based on the blended signal BL. The routine may determine an optimally aligned antenna pointing direction as the direction resulting in the highest value for BL. As described earlier, a corrected antenna steering path (an autotrack path) for antenna 210 may then be established and followed based on the optimally aligned direction. Weighting may be used to arrive at BL based on how far the SQM is above the threshold. When SQM is only slightly above the threshold, the S2 signal may be weighted more than STR or S3. As SQM rises higher, the S2 signal may be weighted less.

As the satellite 120 movement progresses further along path 119 (FIG. 1), at some point the estimated SQM will exceed a second predetermined threshold (Y output of S418C). The second tracking operation may then be performed based entirely on signal strength estimates without DSQM estimates (S418D), which may be referred to as a third tracking mode. In other words, the DSQM estimates are given zero weight for the tracking. One advantage of this technique resides in avoiding the effect of saturation in the DSQM estimate when the signal becomes too strong, and thereby avoiding inaccuracies in the correction of the program track path.

With continuing reference to FIG. 4, once the second tracking operation is performed at S418, the satellite 120 eventually passes the zenith point with respect to antenna 210/310, i.e., typically the position of highest signal strength/SQM, and thereafter SQM starts to fall off. When SQM falls below the threshold again at S406, the tracking returns to the first tracking mode at S408-S412. When DSQM becomes too low, antenna controller 220/320 determines at S420 that a switch to a next satellite 120 in the constellation should occur (Y output of S420). Method 400 may then be performed in the same way with respect to the next satellite.

The various illustrative logical blocks, engines, modules and circuits described in connection with the present disclosure may be implemented or performed with processing circuitry within the antenna controller 220/320 and/or demodulator 260/360 that may read and execute instructions from a non-transitory recording medium (e.g., memory 228). The processing circuitry may include a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, functions described above may be implemented using hardware, software, firmware, or any combination thereof. If implemented in software, the functions may be stored as one or more instructions or code on a non-transitory computer-readable medium (e.g., memory 228). Examples of a computer-readable medium include both computer storage media and communication media including any medium that facilitates transfer of a computer program from one place to another. A storage medium may be any available medium that can be accessed by a computer/processing circuitry. Examples of such computer-readable media include RAM, ROM, EEPROM, CD-ROM or other optical disc storage, magnetic disc storage or other magnetic storage devices, or any other medium that can be used to store desired program code in the form of instructions or data structures and that can be accessed by a computer/processing circuitry.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A method performed by a ground station antenna system, for tracking a non-geosynchronous earth orbit (non-Geo) satellite, comprising:
   receiving a signal from the non-Geo satellite;
   estimating a signal quality metric associated with the signal;
   selecting and implementing a first tracking mode when the estimated signal quality metric is below a threshold;
   in the first tracking mode, demodulating the signal and obtaining demodulated signal quality metric (DSQM) estimates, then performing a first tracking operation to point an antenna beam at the satellite based on the DSQM estimates;
   selecting and implementing a second tracking mode when the estimated signal quality metric is above the threshold; and
   in the second tracking mode, obtaining signal strength estimates of the signal via measurement circuitry, then performing a second tracking operation to point the antenna beam at the satellite based at least in part on the signal strength estimates.

2. The method of claim 1, wherein the DSQM is one of Energy per bit/Noise-spectral density (EbNo), Energy per symbol/Noise-spectral density (EsNo), Error Vector Magnitude (EVM), Bit Error Rate (BER), or a combination thereof.

3. The method of claim 1, wherein the DSQM is obtained after forward error correction (FEC) decoding of the demodulated signal.

4. The method of claim 1, wherein the signal quality metric is one of a signal to noise ratio (SNR) of the signal, a signal to interference plus noise ratio (SINR) of the signal, or a (signal plus noise)/noise (S+N)/N ratio of the signal, prior to demodulation of the signal.

5. The method of claim 4, wherein the signal strength estimates are based on measurements of SNR, SINR or (S+N)/N.

6. The method of claim 1, wherein the second tracking operation is based on the signal strength estimate without any DSQM estimate.

7. The method of claim 1, wherein the threshold is a first threshold and the method further comprises:
   if the estimated signal quality metric is above the first threshold and below a second threshold, performing the second tracking operation to point the antenna beam at the satellite based on a combination of the DSQM estimates and the signal strength estimates; and
   selecting and implementing a third tracking mode when the estimated signal quality metric is above the second threshold, then performing a third tracking operation to point the antenna beam at the satellite based on the signal strength estimates without any DSQM estimates.

8. The method of claim 1, wherein the first tracking operation comprises intentionally mispointing a beam pointing direction of the antenna in a path to arrive at a peak estimate of the signal quality metric, the mispointing being performed with reference to a position estimate of the satellite obtained based on received ephemeris data.

9. The method of claim 8, wherein the mispointing is performed in accordance with a conical step track algorithm.

10. The method of claim 8, wherein the mispointing is performed in accordance with a hill climbing algorithm.

11. The method of claim 1, wherein the second tracking operation is performed using monopulse tracking.

12. The method of claim 1, wherein each of the first and second tracking operations are performed using a same type of mispointing of a beam pointing direction of the antenna to arrive at a peak estimate of the signal quality metric.

13. The method of claim 1, wherein said estimating a signal quality metric associated with the signal comprises receiving ephemeris data, obtaining an elevation position of the non-Geo satellite with respect to an antenna of the ground station antenna system based on the ephemeris data, and estimating the signal quality metric based on the elevation position.

14. A ground station antenna system comprising:
   an antenna configured to at least receive signals from a non-geosynchronous (non-Geo) satellite;
   a receiver including a demodulator to demodulate the signals received by the antenna, and signal strength estimation circuitry configured to measure signal strength of signals received by the antenna;
   a pointing mechanism configured to control a beam pointing direction of the antenna; and an antenna controller configured to track the non-Geo satellite and cause the pointing mechanism to control the beam pointing direction of the antenna in accordance with the tracking, the tracking of the non-Geo satellite including:

estimating a signal quality metric associated with a signal received by the antenna;

when the estimated signal quality metric is below a threshold, obtaining demodulated signal quality metric (DSQM) estimates based on a demodulated signal generated by the demodulator, then performing a first tracking operation based on the DSQM estimates; and when the estimated signal quality is above the threshold, obtaining signal strength estimates of the signal via the signal strength estimation circuitry, then performing a second tracking operation based at least in part on the signal strength estimates.

15. The ground station antenna system of claim 14, wherein the demodulator includes a forward error correction (FEC) decoder, and the DSQM estimates are obtained after FEC decoding by the FEC decoder.

16. The ground station antenna system of claim 14, wherein the pointing mechanism is a mechanical mechanism.

17. The ground station antenna system of claim 14, wherein the antenna is an electronically steered antenna and the pointing mechanism is an electronic steering mechanism.

18. The ground station antenna system of claim 14, wherein the DSQM is one of Energy per bit/Noise-spectral density (EbNo), Energy per symbol/Noise-spectral density (EsNo), Error Vector Magnitude (EVM), Bit Error Rate (BER), or a combination thereof.

19. The ground station antenna system of claim 14, wherein the signal quality metric is one of a signal to noise ratio (SNR), a signal to interference plus noise ratio (SINR) of the signal, or a (signal plus noise)/noise ((S+N)/N) ratio, measured prior to demodulation of the signal.

20. The ground station antenna system of claim 19, wherein the signal strength estimates are based on measurements of SNR, SINR or (S+N)/N.

21. The ground station antenna system of claim 14, further comprising a monopulse tracking receiver configured to perform the second tracking operation using monopulse tracking.

22. The ground station antenna system of claim 14, further comprising a signal blender disposed within the demodulator or the antenna controller, wherein:

the threshold is a first threshold and if the estimated signal quality metric is above the first threshold and below a second threshold, the antenna controller performs the second tracking operation to point the antenna beam at the satellite based on a combination of the DSQM estimates and the signal strength estimates generated by the signal blender, and the antenna controller is further configured to select and implement a third tracking mode when the estimated signal quality metric is above the second threshold and then perform a third tracking operation to point the antenna beam at the satellite based on the signal strength estimates without any DSQM estimates.

23. The ground station antenna system of claim 14, wherein the antenna controller performs the first tracking operation by intentionally mispointing a beam pointing direction of the antenna in a path to arrive at a peak estimate of the signal quality metric, the mispointing being performed with reference to a position estimate of the satellite obtained based on received ephemeris data, and in accordance with a conical step track or hill climbing algorithm.

24. A non-transitory computer-readable recording medium storing instructions that, when executed by a processor, cause a ground station antenna system to implement a method for tracking a non-geosynchronous earth orbit (non-Geo) satellite, wherein the method comprises:

receiving a signal from the non-Geo satellite;

estimating a signal quality metric associated with the signal;

selecting and implementing a first tracking mode when the estimated signal quality metric is below a threshold;

in the first tracking mode, demodulating the signal and obtaining demodulated signal quality metric (DSQM) estimates, then performing a first tracking operation to point an antenna beam at the satellite based on the DSQM estimates;

selecting and implementing a second tracking mode when the estimated signal quality metric is above the threshold; and in the second tracking mode, obtaining signal strength estimates of the signal via measurement circuitry, then performing a second tracking operation to point the antenna beam at the satellite based at least in part on the signal strength estimates.

* * * * *